US009741226B1

(12) United States Patent
Rothschild et al.

(10) Patent No.: US 9,741,226 B1
(45) Date of Patent: Aug. 22, 2017

(54) SYSTEM, METHOD AND DEVICE FOR MONITORING THE STATUS OF AN ENTITY BASED UPON AN ESTABLISHED MONITORING PROFILE

(75) Inventors: Keith Alan Rothschild, Dunwoody, GA (US); Rachel Snow, Marietta, GA (US)

(73) Assignee: COX COMMUNICATIONS, INC, Atlanta, GA (US)

( * ) Notice: Subject to any disclaimer, the term of this patent is extended or adjusted under 35 U.S.C. 154(b) by 83 days.

(21) Appl. No.: 13/151,171

(22) Filed: Jun. 1, 2011

(51) Int. Cl.

| | |
|---|---|
| ***G08B 23/00*** | (2006.01) |
| ***G08B 1/00*** | (2006.01) |
| ***G08B 25/00*** | (2006.01) |
| ***G05B 23/02*** | (2006.01) |
| ***G08B 21/02*** | (2006.01) |
| ***G08B 21/22*** | (2006.01) |

(52) U.S. Cl.
CPC ......... *G08B 21/0288* (2013.01); *G08B 21/22* (2013.01)

(58) Field of Classification Search
CPC .. G08B 21/0288; G08B 21/22; G08B 25/016; G08B 21/0269; G08B 21/0286; G08B 21/0261; G08B 21/02; G08B 21/0283; G08B 21/0258; G08B 21/0277; G08B 21/0446; G08B 21/0211; G08B 21/0227; G08B 21/0294; G08B 25/009; G08B 13/1427; G08B 1/08; G08B 21/0222; G08B 21/0263; G08B 21/028; G08B 21/0453; G08B 21/088; G08B 23/00; G08B 13/19; G08B 13/2434; G08B 17/00; G08B 21/0247; G08B 21/0275; G08B 21/0415; G08B 21/0423; G08B 21/043; G08B 21/0492; G08B 3/1083
USPC ............................ 340/3.1, 573.1, 309, 573.4
See application file for complete search history.

(56) References Cited

U.S. PATENT DOCUMENTS

| | | | | |
|---|---|---|---|---|
| 4,524,243 | A * | 6/1985 | Shapiro | 379/38 |
| 4,743,892 | A * | 5/1988 | Zayle | 340/573.4 |
| 5,933,136 | A | 8/1999 | Brown | |
| 5,997,476 | A * | 12/1999 | Brown | 600/300 |
| 6,771,163 | B2 * | 8/2004 | Linnett et al. | 340/309.5 |

(Continued)

FOREIGN PATENT DOCUMENTS

WO WO 2011120121 A1 * 10/2011

OTHER PUBLICATIONS

Calendar Definition, WaybackMachine, Merriam Webster, Acessed Oct. 8, 2016.*

*Primary Examiner* — Emily C Terrell
(74) *Attorney, Agent, or Firm* — Merchant & Gould

(57) ABSTRACT

A method for monitoring a status of an entity presents an interface for defining status parameters for configuring a monitoring profile, receives input defining status parameters for configuring the monitoring profile, establishes the monitoring profile for a monitored entity based upon the received input defining status parameters for configuring the monitoring profile and executes the established monitoring profile according to the defined status parameters. A processor generates a user interface for receiving input defining status parameters for configuring a monitoring profile, establishes the monitoring profile for a monitored entity based upon the received input defining status parameters for configuring the monitoring profile and executes the established monitoring profile according to the defined status parameters.

36 Claims, 6 Drawing Sheets

(56) References Cited

U.S. PATENT DOCUMENTS

| | | | | |
|---|---|---|---|---|
| 7,185,282 | B1 * | 2/2007 | Naidoo et al. | 715/718 |
| 7,336,187 | B2 * | 2/2008 | Hubbard et al. | 340/573.1 |
| 7,733,224 | B2 * | 6/2010 | Tran | 340/540 |
| 8,271,106 | B2 * | 9/2012 | Wehba et al. | 700/89 |
| 8,537,990 | B2 * | 9/2013 | Rudman | 379/110.01 |
| 8,634,813 | B2 * | 1/2014 | Paschetto | G08B 21/0283 455/404.2 |
| 8,687,626 | B2 * | 4/2014 | Hawkins | H04L 12/66 370/353 |
| 2005/0184875 | A1 * | 8/2005 | Schmandt | G08B 21/0227 340/573.1 |
| 2005/0278409 | A1 * | 12/2005 | Kutzik et al. | 709/200 |
| 2007/0106126 | A1 * | 5/2007 | Mannheimer et al. | 600/300 |
| 2007/0242661 | A1 * | 10/2007 | Tran | H04L 29/1216 370/352 |
| 2007/0258395 | A1 * | 11/2007 | Jollota et al. | 370/310 |
| 2007/0260481 | A1 * | 11/2007 | Marshall | A61B 5/0002 705/2 |
| 2008/0004499 | A1 * | 1/2008 | Davis | 600/300 |
| 2008/0139165 | A1 * | 6/2008 | Gage et al. | 455/404.1 |
| 2010/0094612 | A1 * | 4/2010 | Weerasinghe | H04L 12/5885 703/23 |
| 2010/0222645 | A1 * | 9/2010 | Nadler | A61B 5/1112 600/300 |
| 2011/0172994 | A1 * | 7/2011 | Lindahl | G06F 3/167 704/211 |
| 2012/0218123 | A1 * | 8/2012 | Ji | A61B 5/0022 340/870.07 |

* cited by examiner

SYSTEM, METHOD AND DEVICE FOR MONITORING THE STATUS OF AN ENTITY BASED UPON AN ESTABLISHED MONITORING PROFILE

FIELD OF THE INVENTION

This disclosure relates in general to the safety of an entity, and more particularly to a system, method and device for monitoring the status of an entity based upon an established monitoring profile.

BACKGROUND

In a variety of environments, including for example industrial environments, there is a need for control systems that are capable of governing the operation of one or more pieces of equipment or machinery in a manner that is highly reliable. Distributed systems are becoming increasingly crucial as more and more infrastructures are distributed for redundancy and/or convenience. In such a system, the verification of the proper operation of distributed modules or devices is necessary to meet the objectives of the system. As a result maintenance personnel are required to visit remotely located portions of the system to verify each node or component meets operational parameters. Nevertheless, this is cumbersome, time consuming and expensive.

In addition to complex systems, the verification of the safety or status of someone is often desired. For example, the safe return of people to their home following certain events or interactions with other people, such as dating, meeting friends, attending a meeting, traveling, etc. is often of concern. In such circumstances, a person will usually inform a friend, roommate, parent, or other interested person of their plans so that if something negative occurs or deviation from expectations is detected by the informed person, a checkup call or a call to the authorities may be made. However, this practice is informal and relies upon both parties to perform their responsibilities, i.e., to inform someone and for that person to be vigilant in their monitoring.

One of the primary concerns for single parents of young children surrounds the fear of what would happen to a child if something happened to the single parent overnight. If something were to happen to the single parent overnight, a child may wind up spending an extended period of time uncared for before someone comes to check on the single parent. Currently, there is not an interactive check in system that allows a monitored entity to "check-in" according to a predetermined schedule.

Accordingly, there is a need for a system, method, and device for monitoring a status of an entity based upon an established monitoring profile.

SUMMARY OF THE INVENTION

To overcome the limitations described above, and to overcome other limitations that will become apparent upon reading and understanding the present specification; embodiments for a system, method and device for monitoring the status of an entity based upon an established monitoring profile are disclosed.

The above-described problems are solved by providing a two way interactive system allowing a user to define status parameters for configuring a monitoring profile and monitoring an entity based upon the profile by according to check-in verifications at scheduled times.

An embodiment includes a method for monitoring a status of an entity. The method includes presenting an interface for defining status parameters for configuring a monitoring profile, receiving input defining status parameters for configuring the monitoring profile, establishing the monitoring profile for a monitored entity based upon the received input defining status parameters for configuring the monitoring profile and executing the established monitoring profile according to the defined status parameters.

In another embodiment, a server for providing a monitored check-in system is disclosed. The server includes memory for storing data and a processor, coupled to the memory, the processor generating a user interface for receiving input defining status parameters for configuring a monitoring profile, establishing the monitoring profile for a monitored entity based upon the received input defining status parameters for configuring the monitoring profile and executing the established monitoring profile according to the defined status parameters.

In another embodiment, a computer readable medium is disclosed that includes executable instructions which, when executed by a processor, provides a monitored check-in system. The instructions of the computer readable medium provide the monitored check-in system by receiving input defining status parameters for configuring the monitoring profile, establishing the monitoring profile for a monitored entity based upon the received input defining status parameters for configuring the monitoring profile and executing the established monitoring profile according to the defined status parameters.

These and various other advantages and features of novelty are pointed out with particularity in the claims annexed hereto and form a part hereof. However, for a better understanding of the disclosed embodiments, the advantages, and the objects obtained, reference should be made to the drawings which form a further part hereof, and to accompanying descriptive matter, in which there are illustrated and described specific examples of the disclosed embodiments.

BRIEF DESCRIPTION OF THE DRAWINGS

Referring now to the drawings in which like reference numbers represent corresponding parts throughout.

DETAILED DESCRIPTION

Embodiments are directed to a check in and escalation application that monitors a status of an entity by establishing a monitoring profile based upon input defining status parameters. The established monitoring profile defines a schedule for executing an escalation flow of ordered verification mechanisms used to verify the status of a monitored entity. If the monitored entity fails to check-in within a schedule time window, the system will attempt to contact the user, e.g., call the user's mobile device via an automated system. If the call in not acknowledged, the system will attempt to call an alternate contact. Should no alternate contact be able to be contacted, the system will escalate to notify the authorities. Such a two way interactive check in system can be used for anyone who is concerned that something may happen by requiring a check-in after a specified amount of time.

Figure 1:
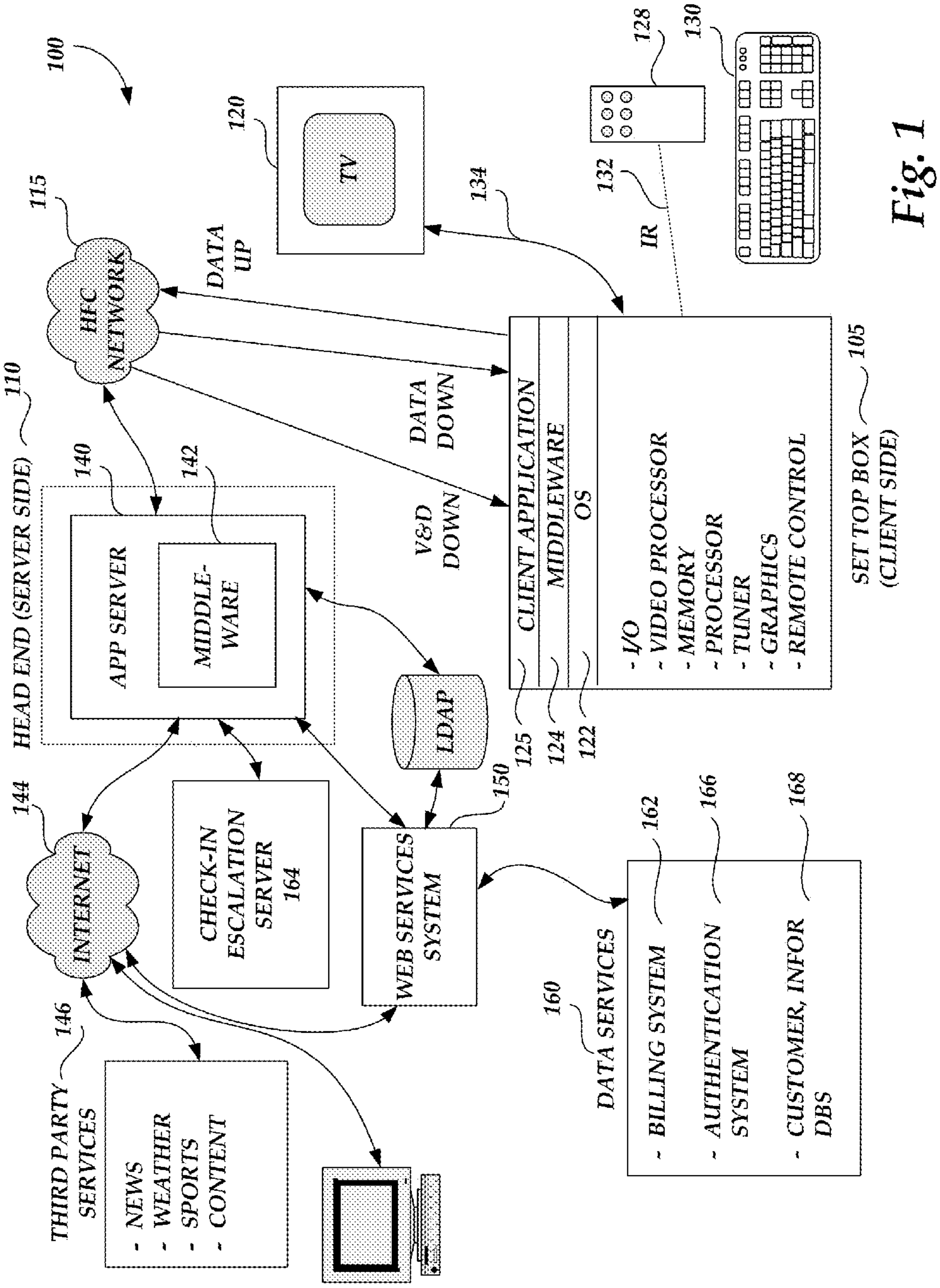
FIG. 1 is a simplified block diagram illustrating a cable television/services system architecture providing an operating environment according to one embodiment.

FIG. 1 is a simplified block diagram illustrating a cable television/services system 100 (hereafter referred to as "CATV") architecture providing an operating environment according to an embodiment. Referring now to FIG. 1, digital and analog video programming, information content and interactive television services are provided via a hybrid fiber coax (HFC) network 115 to a television set 120 for consumption by a cable television/services system customer. As is known to those skilled in the art, HFC networks 115 combine both optical fiber and coaxial cable lines. Typically, optical fiber runs from the cable head end 110 to neighborhoods of 500 to 2,000 customers. Coaxial cable runs from the optical fiber feeders to each customer. According to embodiments, the functionality of the HFC network 115 allows for efficient bidirectional data flow between the client-side set-top box 105 and the server-side application server 140 of the embodiment.

According to embodiments, the CATV system 100 is in the form of a distributed client-server computing system for providing video and data flow across the HFC network 115 between server-side services providers (e.g., cable television/services providers) via a server-side head end 110 and a client-side customer via a client-side set-top box (STB) 105 functionally connected to a customer receiving device, such as the television set 120. As is understood by those skilled in the art, modem CATV systems 100 may provide a variety of services across the HFC network 115 including traditional digital and analog video programming, telephone services, high speed Internet access, video-on-demand, and information services.

On the client side of the CATV system 100, digital and analog video programming and digital and analog data are provided to the customer television set 120 via the set-top box (STB) 105. Interactive television services that allow a customer to input data to the CATV system 100 likewise are provided by the STB 105. As illustrated in FIG. 1, the STB 105 is a multipurpose computing device having a computer processor, memory, and an input/output mechanism. The input/output mechanism receives input from server-side processes via the HFC network 115 and from customers via input devices such as the remote control device 128 and the keyboard 130. The remote control device 128 and the keyboard 130 may communicate with the STB 105 via a suitable communication transport such as the infrared connection 132. The remote control device 128 may include a biometric input module 129. The STB 105 also includes a video processor for processing and providing digital and analog video signaling to the television set 120 via a cable communication transport 134. A multi-channel tuner is provided for processing video and data to and from the STB 105 and the server-side head end system 110, described below.

The STB 105 also includes an operating system 122 for directing the functions of the STB 105 in conjunction with a variety of client applications 125. For example, if a client application 125 requires a news flash from a third-party news source to be displayed on the television 120, the operating system 122 may cause the graphics functionality and video processor of the STB 105, for example, to output the news flash to the television 120 at the direction of the client application 125 responsible for displaying news items.

Because a variety of different operating systems 122 may be utilized by a variety of different brands and types of set-top boxes, a middleware layer 124 is provided to allow a given software application to be executed by a variety of different operating systems. According to an embodiment, the middleware layer 124 may include a set of application programming interfaces (APIs) that are exposed to client applications 125 and operating systems 122 that allow the client applications to communicate with the operating systems through common data calls understood via the API set. As described below, a corresponding middleware layer is included on the server side of the CATV system 100 for facilitating communication between the server-side application server and the client-side STB 105. According to one embodiment; the middleware layer 142 of the server-side application server and the middleware layer 124 of the client-side STB 105 format data passed between the client side and server side according to the Extensible Markup Language (XML).

The set-top box 105 passes digital and analog video and data signaling to the television 120 via a one-way communication transport 134. The STB 105 may receive video and data from the server side of the CATV system 100 via the HFC network 115 through a video/data downlink and data via a data downlink. The STB 105 may transmit data from the client side of the CATV system 100 to the server side of the CATV system 100 via the HFC network 115 via one data uplink. The video/data downlink is an "in band" downlink that allows for digital and analog video and data signaling from the server side of the CATV system 100 through the HFC network 115 to the set-top box 105 for use by the STB 105 and for distribution to the television set 120. As is understood by those skilled in the art, the "in band" signaling space operates at a frequency between 54 and 860 megahertz. The signaling space between 54 and 860 megahertz is generally divided into 6 megahertz channels in which may be transmitted a single analog signal or a greater number (e.g., up to ten) digital signals.

The data downlink and the data uplink, illustrated in FIG. 1, between the HFC network 115 and the set-top box 105 comprise "out of band" data links. As is understand by those skilled in the art, the "out of band" frequency range generally lies between zero and 54 megahertz. According to embodiments, data flow between the client-side set-top box 105 and the server-side application server 140 is typically passed through the "out of band" data links. Alternatively, an "in band" data carousel may be positioned in an "in band" channel into which a data feed may be processed from the server-side application server 140 through the HFC network 115 to the client-side STB 105. Operation of data transport between components of the CATV system 100, described with reference to FIG. 1, is well known to those skilled in the art.

Referring still to FIG. 1, the head end 110 of the CATV system 100 is positioned on the server side of the CATV system and includes hardware and software systems responsible for originating and managing content for distributing through the HFC network 115 to client-side STBs 105 for presentation to customers via televisions 120. As described above, a number of services may be provided by the CATV system 100, including digital and analog video programming, interactive television services, telephone services, video-on-demand services, targeted advertising, and provision of information content.

The application server 140 is a general-purpose computing system operative to assemble and manage data sent to and received from the client-side set-top box 105 via the HFC network 115. As described above with reference to the set-top box 105, the application server 140 includes a middleware layer 142 for processing and preparing data from the head end of the CATV system 100 for receipt and use by the client-side set-top box 105. For example, the application server 140 via the middleware layer 142 may obtain data from third-party services 146 via the Internet 140 for transmitting to a customer through the HFC network 115 and the set-top box 105. For example, a weather report from a third-party weather service may be downloaded by the application server via the Internet 144. When the application server 140 receives the downloaded weather report, the middleware layer 142 may be utilized to format the weather report for receipt and use by the set-top box 105.

According to one embodiment, data obtained and managed by the middleware layer 142 of the application server 140 is formatted according to the Extensible Markup Language and is passed to the set-top box 105 through the HFC network 115 where the XML-formatted data may be utilized by a client application 126 in concert with the middleware layer 124, as described above. As should be appreciated by those skilled in the art, a variety of third-party services data, including news data, weather data, sports data and other information content may be obtained by the application server 140 via distributed computing environments such as the Internet 144 for provision to customers via the HFC network 115 and the set-top box 105.

According to embodiments, the application server 140 obtains customer support services data, including billing data, information on customer work order status, answers to frequently asked questions, services provider contact information, and the like from data services 160 for provision to the customer via an interactive television session. As illustrated in FIG. 1, the services provider data services 160 include a number of services operated by the services provider of the CATV system 100 which may include data on a given customer.

A billing system 162 may include information such as a customer's name, street address, business identification number, Social Security number, credit history, and information regarding services and products subscribed to by the customer. According to embodiments, the billing system 162 may also include billing data for services and products subscribed to by the customer for bill processing billing presentment and payment receipt.

A customer information database 168 may include general information about customers such as place of employment, business address, business telephone number, and demographic information such as age, gender, educational level, and the like. The customer information database 168 may also include information on pending work orders for services or products ordered by the customer. The customer information database 168 may also include general customer information such as answers to frequently asked customer questions and contact information for various service provider offices/departments. As should be understood, this information may be stored in a variety of disparate databases operated by the cable services provider.

A cross-platform check-in escalation server 164 may be provided. For example, a cross-platform check-in escalation server 164 may be coupled to the head end 110. The cross-platform check-in escalation server 164 includes or accesses information such as electronic mail addresses, high-speed Internet verification mechanisms, and electronic mail usage data to check on and verify the status of a monitored entity. Herein, a monitored entity is used to refer to a person, a group of people, systems, operations, etc. that may be monitored using a monitoring profile and associated status parameters. Verification mechanisms refer to procedures, devices and functions used to check on and verify status of a monitored entity and status refers to the identification of the safety and/or security of a person, a state of an event, etc.

To support the check-in escalation server 164, an authentication system 166 may be provided. The authentication system 166 may include information such as secure user names and passwords utilized by customers for access to network services. As should be understood by those skilled in the art, the disparate data services systems 162, 164, 166, 168 are illustrated as a collection of data services for purposes of example only. The example data services systems comprising the data services 160 may operate as separate data services systems, which communicate with a web services system (described below) along a number of different communication paths and according to a number of different communication protocols. However, the data services 160 may also be configured to communicate with other server-side components.

Referring still to FIG. 1, a web services system 150 is illustrated between the application server 140 and the data services 160. According to embodiments, web services system 150 serves as a collection point for data requested from each of the disparate data services systems comprising the data services 160. According to embodiments, when the application server 140 requires customer services data from one or more of the data services 160, the application server 140 passes a data query to the web services system 150. The web services system formulates a data query to each of the available data services systems for obtaining any required data for a requesting customer as identified by a set-top box identification associated with the customer. The web services system 150 serves as an abstraction layer between the various data services systems and the application server 140. That is, the application server 140 is not required to communicate with the disparate data services systems, nor is the application server 140 required to understand the data structures or data types utilized by the disparate data services systems. The web services system 150 is operative to communicate with each of the disparate data services systems for obtaining necessary customer data. The customer data obtained by the web services system is assembled and is returned to the application server 140 for ultimate processing via the middleware layer 142, as described above.

Figure 2:
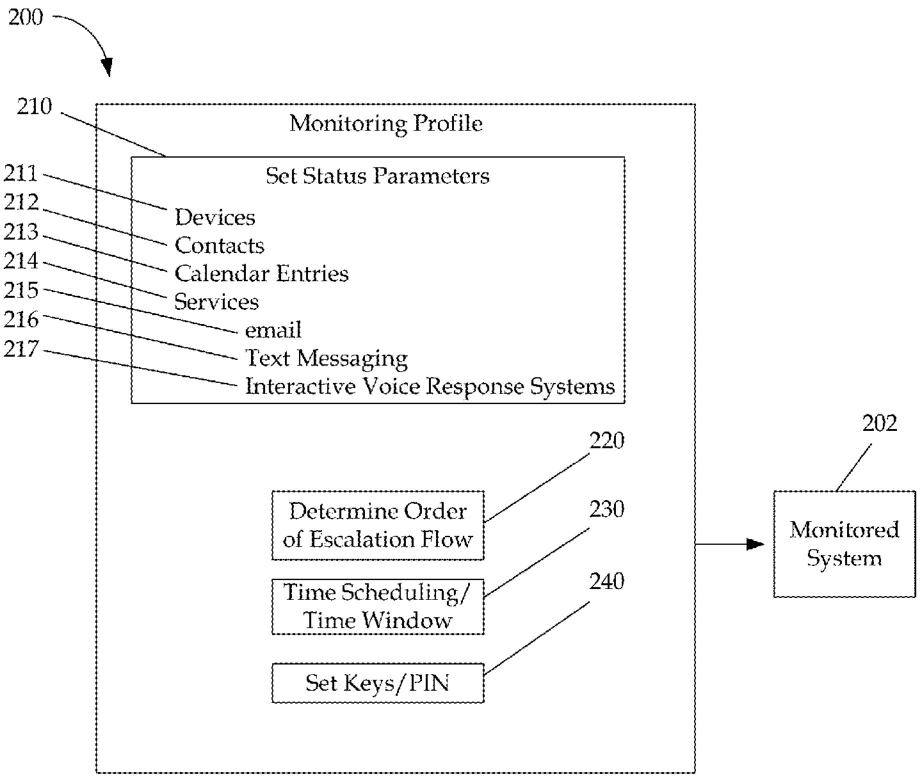
FIG. 2 provides a simple block diagram illustrating the user input information or status parameters received for configuring the monitoring profile according to one embodiment.

FIG. 2 provides a simple block diagram illustrating the users input information or status parameters received for configuring the monitoring profile 200 according to one embodiment. The monitoring profile 200 includes all data, rules and other information used to check the status of a monitored entity 202. Herein, status parameters is used to refer to any type of information capable of being used to configure a monitoring profile including devices, contacts, calendar entries and services such as email, text messaging and interactive voice response systems. As discussed above, a monitored entity is a person, a group of people, systems, operations, etc. that may be monitored using a monitoring profile and associated status parameters. In addition, a primary entity is an entity that sets parameters and controls status checks associated with a secondary entity (e.g., a parent, supervisor). A secondary entity refers to an entity that is being monitored by the primary entity (e.g., a child, employee/subordinate).

The monitoring entity 202 may be the primary entity, in other words the entity setting parameters and controlling status checks. Thus, a primary entity may be self-monitoring, i.e., the primary entity sets the parameters and controls status checks associated with itself, or may monitor a secondary entity. As shown in FIG. 2, the monitoring entity 202 may be the secondary entity, i.e., an entity monitored by the primary entity.

The subscriber sets the verification mechanisms according to the status parameters 210 by providing any type of information which may include devices 211, contacts 212, calendar entries 213 and services 214, such as email 215, text messaging 216, and interactive voice response systems 217 used to verify the status of the monitored entity 202. An escalation flow is an ordered list of devices and services used to check the status of a monitored entity. As discussed above, verification mechanisms refer to procedures, devices and functions used to check on and verify status of a monitored entity. The subscriber defines the order of the escalation flow 220 which determines the order of devices and services (verification mechanisms) that are checked to verify the status of a monitored entity 202. The subscriber also needs to provide time scheduling/time window 230 for checking in request and for waiting to receive a response, respectively. The time window 230 sets a period to wait before escalating to the next verification mechanisms when a response is not received before the expiration of the time window 230.

The received status parameters may include a key/PIN 240 for providing secure access to the monitoring profile. A key or PIN refers to a code, identifier, password, etc. used for authentication, to prove identity or gain access to a resource. The subscriber may select a key/PIN 240 that is used to check in to the system. Instead of a key/PIN 240, the user may designate a name code selected from a plurality of codes, each of the plurality of codes having a predetermined meaning. For example, there may be a key for vacation mode and a key requesting authority to be called.

Figure 3:
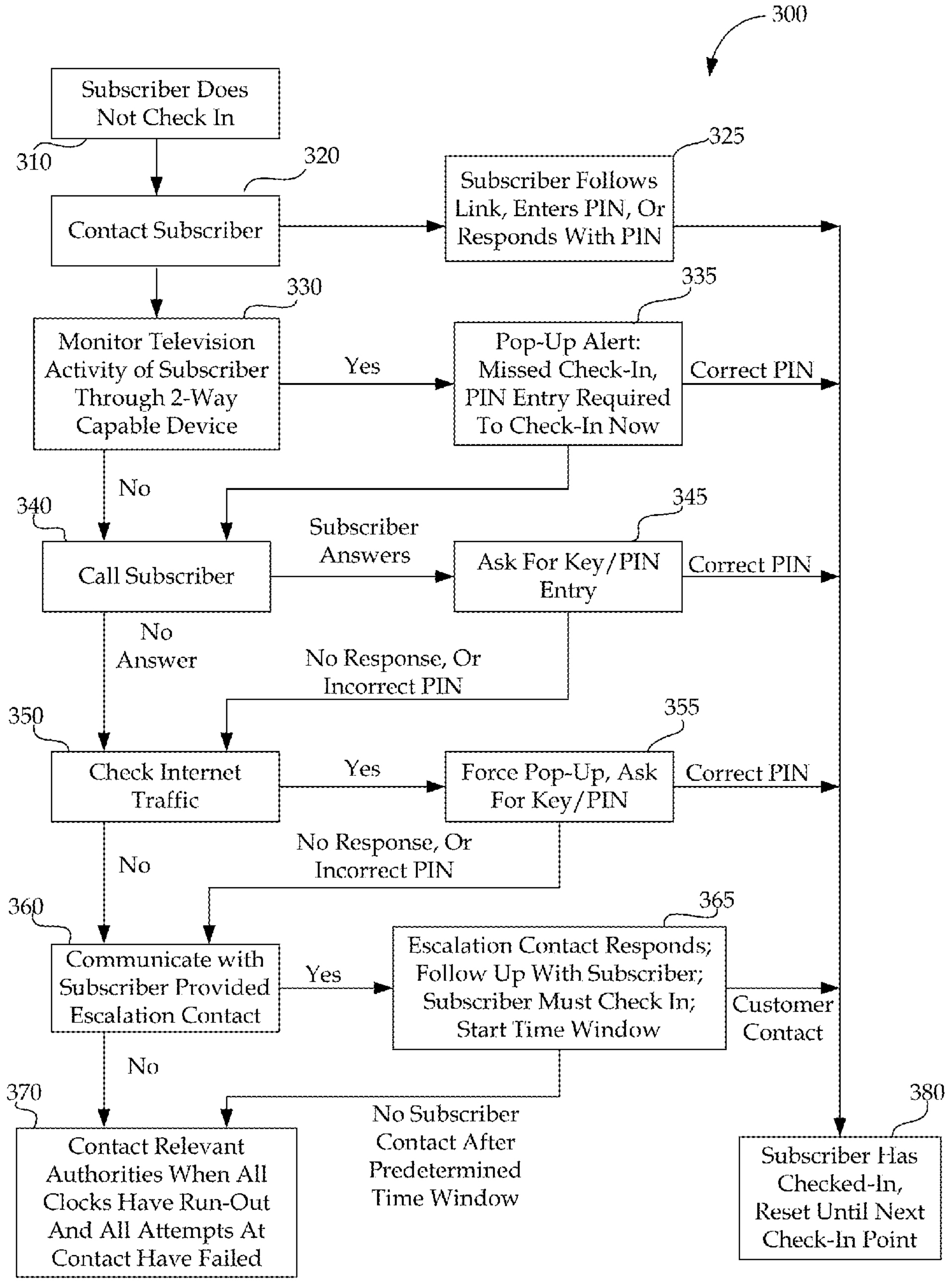
FIG. 3 illustrates the escalation flow based upon an established monitoring profile when the subscriber does not check in according to one embodiment.

FIG. 3 illustrates the escalation flow based upon an established monitoring profile when the subscriber does not check in 300 according to one embodiment. The escalation flow includes a series of verification mechanisms provided in an order that is defined by the status parameters initially set by the subscriber. The verification mechanisms are used to check on and verify the status of a monitored entity. Thus the monitoring profile for a monitored entity is based upon the received input defining status parameters (see FIG. 2) which may include devices, contacts, calendar entries and services such as email, text messaging, and interactive voice response systems. If the subscriber does not check in at a scheduled time 310, the monitoring system attempts to contact the subscriber 320. If the subscriber follows the link and responds with the PIN/key used to prove identity or gain access to a resource 325, the subscriber is considered checked-in 380. This results in termination and resetting the schedule for initiating the execution of the established monitoring profile. If the subscriber fails to respond and verify status, the verification mechanism of monitoring television activity of the subscriber through two way capable device is implemented 330. An alert message to check-in is displayed 335 when television activity is detected. If subscriber responds with the correct PIN, the check-in is complete 380. The next verification mechanism is to call the subscriber 340. If the subscriber answers and responds with the correct PIN/key 345, the check-in is complete 380. Internet traffic is checked 350 when there is no response from the subscriber, or an incorrect PIN is received. This may include activity on the email account, web activity, or cell phone activity. If activity is detected, a force pop-up message asking for the PIN 355 is displayed. If subscriber responds with the correct PIN, the check-in is complete 380. The next verification mechanism in the escalation flow is to communicate with the subscriber provided contact 360. When the escalation contact responds, the subscriber must still check in within a predetermined period 365. When communication with the subscriber provided escalation contact fails or the subscriber fails to check within all the timeframes, relevant authorities are contacted 370.

Figure 4:
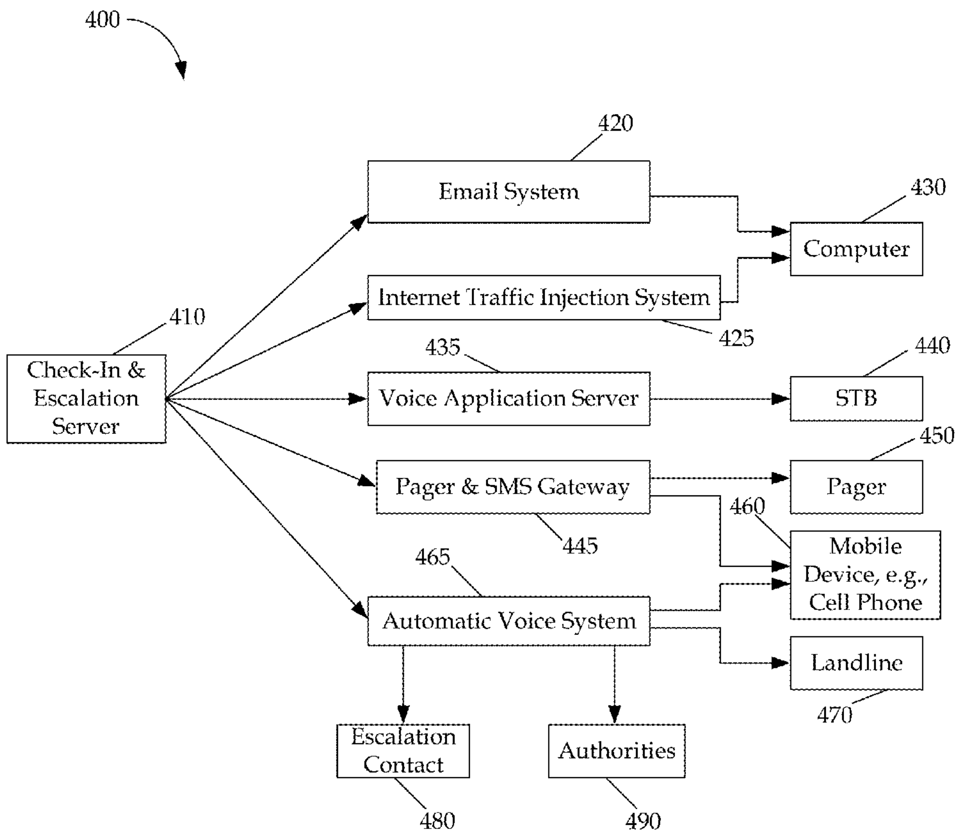
FIG. 4 is a block diagram showing the various interfaces utilized by the Check-in & Escalation server according to one embodiment.

FIG. 4 is a block diagram showing various interfaces utilized by the Check-in & Escalation server 400 according to one embodiment. The check-in & escalation server 410 may use any two-way interactive interface for validation. The check-in system provides implementation procedures for the user, and sets timeframes requiring the user to respond to check-in requests. In addition, verification mechanisms for contacting the user because of missed check-ins which may include identification of associated phone numbers, text messages, or web activity are necessary. The email system 420 and the internet traffic injection system 425 provide communication via the user's computer 430. For example, the internet traffic injection system allows a forced display of a message which may be a "verify status and check-in alert" message if web activity is detected. The Voice Application Server 435 communicates with the user's set top box (STB) 440 to determine whether someone is watching TV on the account. The Pager & SMS Gateway 445 signals the user's pager 450 or mobile device 460 for a request to check in of the monitored entity. The Automatic Voice System 465 communicates with both the mobile device 460 and the user's landline 470 through use of voice. Interactive voice response (IVR) allows customers to interact with the server via a telephone keypad or by speech recognition. In addition, the escalation contact 480 and authorities 490 can be notified through the Automatic Voice System 465.

Figure 5:
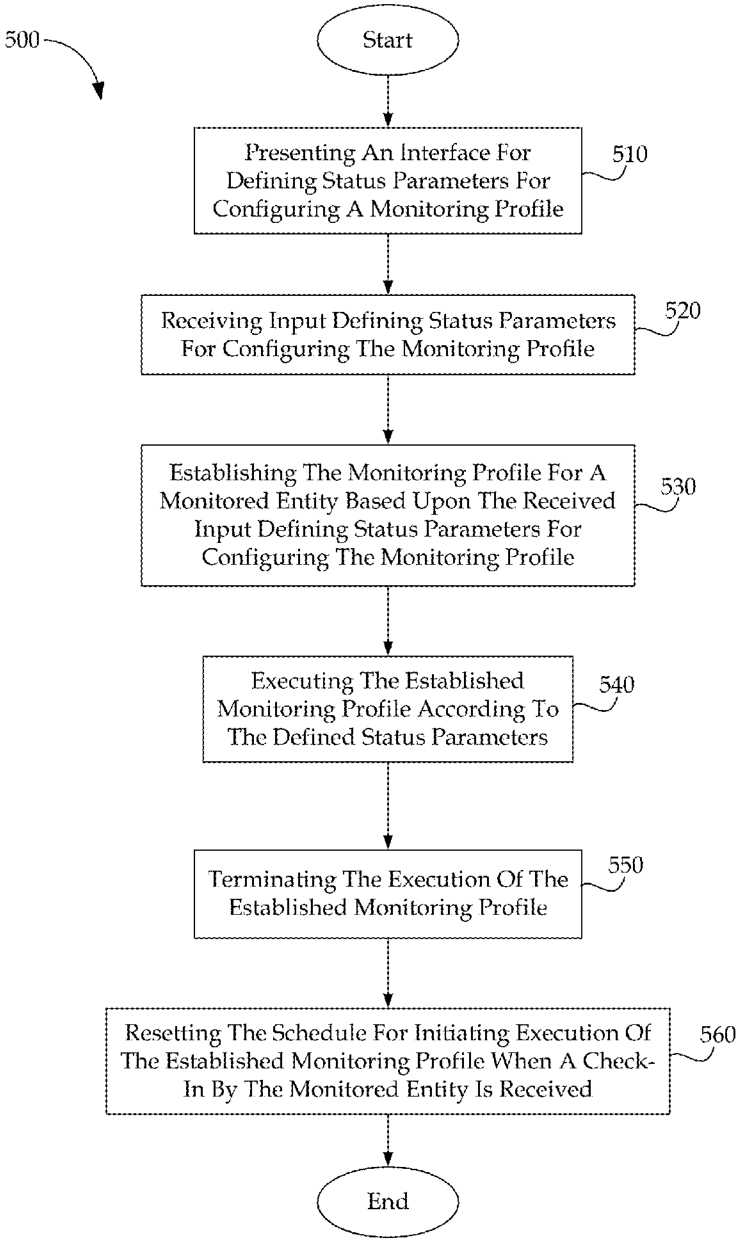
FIG. 5 is a flowchart representing a flow for the monitoring of an entity according to one embodiment.

FIG. 5 is a flowchart representing a flow for the monitoring of an entity according to one embodiment. In FIG. 5, an interface is presented for defining status parameters for configuring a monitoring profile 510. Input is received that defines status parameters for configuring the monitoring profile 520. For example, the input received for defining status parameters for configuring the monitoring profile may include an ordered list of verification mechanisms and a schedule for initiating execution of the established monitoring profile, a check-in time and a list of verification mechanisms ordered according to the escalation flow, a time window for waiting to receive a response to a verification mechanism and implementing a next verification mechanism in the escalation flow when a response is not received before expiration of the time window and a key for providing secure access to the monitoring profile for the monitored entity.

The monitoring profile for a monitored entity is established based upon the received input defining status parameters for configuring the monitoring profile 530. The established monitoring profile may include an escalation flow, wherein the escalation flow includes a series of verification mechanisms provided in an order defined by the status parameters. The established monitoring profile may also include establishing a monitoring profile for a secondary entity to verify a status of the secondary entity, wherein a primary entity contacts the secondary entity only when the status of the secondary entity is not verified according to the monitoring profile for the secondary entity. The established monitoring profile is executed according to the defined status parameters 540. When a status of an entity is verified, or when the execution of the escalation flow leads to authorities being contacted, the execution of the established monitoring profile is terminated 550. When a check-in by the monitored entity is received, the schedule is reset for initiating re-execution of the established monitoring profile 560.

Figure 6:
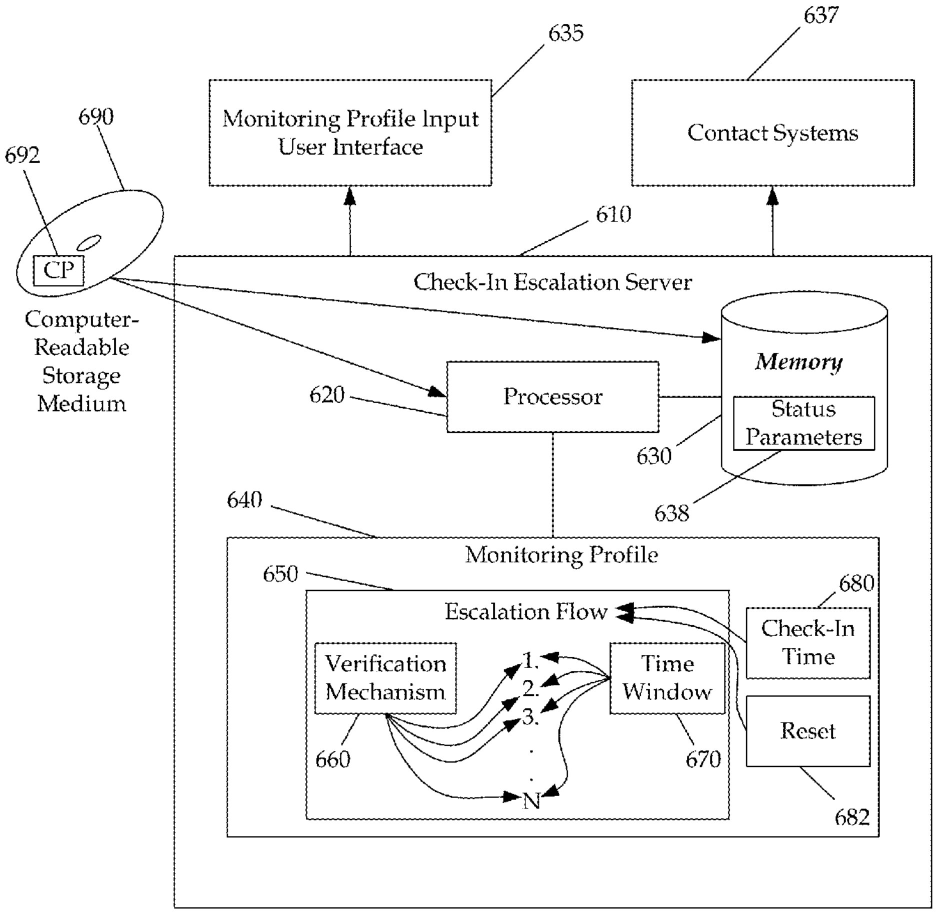
FIG. 6 illustrates a suitable computing environment for implementing a system as described above in FIGS. 1-5 according to an embodiment.

FIG. 6 illustrates a suitable computing environment 600 for implementing a system as described above in FIGS. 1-5 according to an embodiment. In FIG. 6, a check-in escalation server 610 includes a processor 620 and memory 630. Those skilled in the art will recognize that the server 610 may be implemented in a head end module, a session resource manager, and other data/content control devices. Embodiments may also be implemented in combination with other types of computer systems and program modules. Generally, program modules include routines, programs, components, data structures, and other types of structures that perform particular tasks or implement particular abstract data types. By way of example, computer readable media 690 can include computer storage media or other tangible media. Computer readable storage media 690 includes volatile and nonvolatile, removable and non-removable media implemented in any method or technology for storage of information 692, such as computer readable instructions, data structures, program modules or other data. Moreover, those skilled in the art will appreciate that other computer system configurations may be implemented, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network.

Embodiments implemented on computer-readable storage media 690 may refer to a mass storage device, such as a hard disk or CD-ROM drive. However, it should be appreciated by those skilled in the art that tangible computer-readable media can be any available media that can be accessed or utilized by a processing device, e.g., server or communications network provider infrastructure.

By way of example, and not limitation, computer-readable media 690 may include, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other tangible medium which can be used to store the desired information and which can be accessed by a processing device.

As mentioned briefly above, a number of program modules and data files may be stored and arranged for controlling the operation of processing devices. Thus, one or more processing devices 620 may be configured to execute instructions that perform the operations of embodiments. For example, the processor 620 initiates execution of the escalation flow 650 of the verification mechanisms 660 that is set based upon the monitoring profile input 635 to perform checks in an order defined by the monitoring profile 640 to verify the status of a monitored entity. The check-in escalation server 610 accesses contact systems 637 that the subscriber set as verification mechanisms in the status parameters 638 stored in memory 630. The contact systems 637 may include a phone system, email systems, text messaging systems, interactive voice response systems or any other system for used to verify the status of a monitored entity. This process happens when the monitored entity fails to check-in at the required time 680. There is a time window 670 for waiting to receive a response from the monitored entity before the next verification mechanism is performed. The check-in time 680 is reset 682 once the required response is received.

It should also be appreciated that various embodiments can be implemented (1) as a sequence of computer implemented acts or program modules running on a processing device and/or (2) as interconnected machine logic circuits or circuit modules within the processing devices. The implementation is a matter of choice dependent on the performance requirements. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of embodiments as recited within the claims set forth herein.

Memory 630 thus may store the computer-executable instructions that, when executed by processor 620, cause the processor 620 to implement a monitoring profile 640 according to an embodiment as described above with reference to FIGS. 1-5.

The foregoing description of the embodiments has been presented for the purposes of illustration and description. It is not intended to be exhaustive or to limit the embodiments to the precise form disclosed. Many modifications and variations are possible in light of the above teaching. It is intended that the scope of the embodiments be limited not with this detailed description, but rather by the claims appended hereto.

What is claimed is:

1. A method for monitoring a status of an entity, comprising:
- presenting an interface for defining status parameters for configuring a monitoring profile;
- receiving input defining status parameters for configuring the monitoring profile;
- establishing the monitoring profile for a monitored entity based upon the received input defining status parameters for configuring the monitoring profile;
- executing the established monitoring profile according to the defined status parameters, the defined status parameters identifying devices, contacts, calendar entries and services associated with the monitored entity, wherein executing the established monitoring profile defines a schedule for an escalation flow of verification mechanisms to verify the status of the monitored entity, wherein the schedule includes setting a time period associated with each of the verification mechanisms, and wherein the escalation flow being implemented via a two-way interactive interface, the escalation flow including:
  - sending messages to the monitored entity via a mobile device requesting the monitored entity to verify the status,
  - monitoring, via a set top box, television activity of the monitored entity and when television activity is detected, requesting the monitored entity to verify the status, monitoring email and internet traffic for the monitored entity and when email and internet activity is detected, requesting the monitored entity to verify the status; and sending a communication, via an automatic voice system, to a contact identified by the defined status parameters, wherein the contact is identified in the contacts or the calendar entries, and when an escalation contact responds to the communication the escalation contact is given a predetermined time window to follow up with the monitored entity and have a subscriber check-in, in response to receiving a check-in by the monitored entity, terminating execution of the established monitoring profile; and resetting the schedule for initiating execution of the established monitoring profile.

2. The method of claim 1, wherein the establishing the monitoring profile further comprises creating the escalation flow, the escalation flow including a series of verification mechanisms provided in an order defined by the status parameters.

3. The method of claim 2, wherein the executing the established monitoring profile according to the defined status parameters further comprises executing the escalation flow by initiating the verification mechanisms in the order defined by the status parameters until a verification mechanism results in receipt of a check-in by the monitored entity.

4. The method of claim 1, wherein the receiving input defining status parameters for configuring the monitoring profile further comprises receiving an ordered list of verification mechanisms and the schedule for initiating execution of the established monitoring profile.

5. The method of claim 1, wherein the receiving input defining status parameters for configuring the monitoring profile further comprises receiving a check-in time and a list of verification mechanisms ordered according to the escalation flow.

6. The method of claim 5, wherein the receiving input defining status parameters for configuring the monitoring profile further comprises receiving a time window for waiting to receive a response to a verification mechanism and implementing a next verification mechanism in the escalation flow when the response is not received before expiration of the time window.

7. The method of claim 5, wherein the receiving input defining status parameters for configuring the monitoring profile further comprises receiving a key for providing secure access to the monitoring profile for the monitored entity.

8. The method of claim 7, wherein the receiving the key for providing secure access to the monitoring profile for the monitored entity provides secure access by an emergency contact of the monitored entity for verifying status of the monitored entity.

9. The method of claim 7, wherein the receiving the key for providing secure access to the monitoring profile for the monitored entity provides access to a log of status verification associated with the monitored entity.

10. The method of claim 1, wherein the executing the established monitoring profile according to the defined status parameters further comprises monitoring activity of a device of the monitored entity and implementing contact with the monitored entity through the device when activity associated with the device is detected.

11. The method of claim 1, wherein the establishing a monitoring profile for a monitored entity further comprises establishing a monitoring profile for a secondary entity to verify the status of the secondary entity and wherein the executing the established monitoring profile according to the defined status parameters further comprises contacting a primary entity only when the status of the secondary entity is not verified according to the monitoring profile for the secondary entity.

12. A server for providing a monitored check-in system, comprising:

memory for storing data; and a processor, coupled to the memory, the processor generating a user interface for: receiving input defining status parameters for configuring a monitoring profile, establishing the monitoring profile for a monitored entity based upon the received input defining status parameters for configuring the monitoring profile and executing the established monitoring profile according to the defined status parameters, the defined status parameters identifying devices, contacts, calendar entries and services associated with the monitored entity, wherein executing the established monitoring profile defines a schedule for an escalation flow comprising at least one verification mechanism to verify a status of the monitored entity, wherein the schedule includes setting a time period associated with each of the verification mechanisms, and wherein the escalation flow being implemented via an two-way interactive interface, the escalation flow including:

sending messages to the monitored entity via a mobile device requesting the monitored entity to verify the status;

monitoring, via a set top box, television activity of the monitored entity and when television activity is detected, requesting the monitored entity to verify the status;

monitoring email and internet traffic for the monitored entity and when email and internet activity is detected, requesting the monitored entity to verify the status;

sending a communication, via an automatic voice system, to a contact identified by the defined status parameters, wherein the contact is identified in the contacts or the calendar entries, and when an escalation contact responds to the communication the escalation contact is given a predetermined time window to follow up with the monitored entity and have a subscriber check-in;

in response to receiving a check-in by the monitored entity, terminating execution of the established monitoring profile; and resetting the schedule for initiating execution of the established monitoring profile.

13. The server of claim 12, wherein the escalation flow including a series of verification mechanisms provided in an order defined by the status parameters for checking the status of the monitored entity.

14. The server of claim 13, wherein the verification mechanisms comprises at least one emergency contact and at least one user device capable of receiving status inquiries from the processor.

15. The server of claim 13, wherein the verification mechanisms comprises information for contacting local authorities.

16. The server of claim 13, wherein the processor initiates the verification mechanisms in the order defined by the status parameters until a verification mechanism results in receipt of a check-in by the monitored entity.

17. The server of claim 12, wherein the processor terminates the execution of the established monitoring profile and resets a check-in time for initiating execution of the established monitoring profile when the status of the monitored entity is received.

18. The server of claim 12, wherein the received input status parameters for configuring the monitoring profile further comprises a schedule of check-in times and a list of verification mechanisms ordered according to the escalation flow.

19. The server of claim 18, wherein the received input status parameters for configuring the monitoring profile further comprises a time window for waiting to receive a response to a verification mechanism, wherein the processor implements a next verification mechanism in the escalation flow when the response is not received before expiration of the time window.

20. The server of claim 18, wherein the received input status parameters for configuring the monitoring profile further comprises a key for providing secure access to the monitoring profile for the monitored entity.

21. The server of claim 20, wherein the key is selected from a plurality of codes, each of the plurality of codes having a predetermined meaning.

22. The server of claim 20, wherein the key is selected for a code requesting authorities to be called.

23. The server of claim 20, wherein the key is selected for a code used to restrict a device to contacting only the monitored entity.

24. The server of claim 20, wherein the key is verified by the processor and, upon verification, the processor provides secure access to the monitoring profile by an emergency contact of the monitored entity for verifying status of the monitored entity.

25. The server of claim 20, wherein the key is verified by the processor and, upon verification, the processor provides access to a log of status verification associated with the monitored entity.

26. The server of claim 12, wherein the processor monitors activity of a device of the monitored entity and implements contact with the monitored entity through the device when activity associated with the device is detected.

27. The server of claim 12, wherein the monitoring profile establishes an escalation flow associated with a secondary entity for verifying a status of the secondary entity and wherein the processor contacts a primary entity only when the status of the secondary entity is not verified according to the escalation flow associated with the secondary entity.

28. The server of claim 12, wherein the monitoring profile for the monitored entity includes an order list of devices to use to contact the monitored entity.

29. The server of claim 28, wherein the order list of devices include at least one selected from the group consisting of a set-top box, a mobile communication device, a computer having Internet access and an interactive voice response system.

30. The server of claim 28, wherein the processor contacts devices in the ordered list of devices via at least one selected from the group consisting of pop-up messages displayed on a television, an interactive program guide, text messaging, email messaging, browser messaging, and a telephone.

31. The server of claim 12, wherein the processor monitors a location of a monitored entity relative to an itinerary provided according the monitoring profile.

32. The server of claim 12, wherein the monitoring profile includes a setting for disengaging status checks for the monitored entity.

33. The server of claim 12, wherein the processor contacts the monitored entity using a two-way communication service.

34. The server of claim 12, wherein the processor is disposed in a consumer device.

35. A computing device including a processor and a memory including executable instructions which, when executed by the processor, provides an escalation flow in a monitored check-in system, by:

receiving input defining status parameters for configuring the monitoring profile;

establishing the monitoring profile for a monitored entity based upon the received input defining status parameters for configuring the monitoring profile wherein defining status parameters comprises establishing at least one verification mechanism;

executing the established monitoring profile according to the defined status parameters, the defined status parameters identifying devices, contacts, calendar entries and services associated with the monitored entity, wherein executing the established monitoring profile defines a schedule for an escalation flow of verification mechanisms to verify a status of the monitored entity, wherein the schedule includes setting a time period associated with each of the verification mechanisms, and wherein the escalation flow being implemented via a two-way interactive interface, the escalation flow including:

sending messages to the monitored entity via a mobile device requesting the monitored entity to verify the status, monitoring, via a set top box, television activity of the monitored entity and when television activity is detected, requesting the monitored entity to verify the status, monitoring email and internet traffic for the monitored entity and when email and internet activity is detected, requesting the monitored entity to verify the status, sending a communication to the monitored entity via an automatic voice system, wherein interactive voice response allows the monitored entity to interact via telephone keypad or speech recognition, sending a communication, via the automatic voice system, to an escalation contact provided by the monitored entity to request the status of the monitored entity, wherein the escalation contact is identified in the contacts or the calendar entries, wherein interactive voice responses allow the escalation contact to interact via telephone keypad or speech recognition, and when the escalation contact responds to the communication the escalation contact is given a predetermined time window to follow up with the monitored entity and have a subscriber check-in, wherein the escalation flow performs an operation according to the schedule, and in response to the monitored entity not verifying the status, the escalation flow performs subsequent operations according to the schedule; and when all attempts to verify the status of the subscriber have failed, contacting relevant authorities, via the automatic voice system, to notify the relevant authorities that the monitored entity has failed to check-in;

in response to receiving a check-in by the monitored entity, terminating execution of the established monitoring profile; and resetting the schedule for initiating execution of the established monitoring profile.

36. The server of claim 20, wherein the email and internet traffic for the monitored entity is associated with a computer for the monitored entity.

* * * * *